Sept. 24, 1974     O. L. POWERS     3,838,016
WATER STILL

Filed March 29, 1972     3 Sheets-Sheet 1

United States Patent Office 3,838,016
Patented Sept. 24, 1974

3,838,016
WATER STILL
Otto L. Powers, 231 Coronada Blvd.,
Titusville, Fla. 32780
Filed Mar. 29, 1972, Ser. No. 239,194
Int. Cl. B01d 3/00
U.S. Cl. 202—83                 11 Claims

ABSTRACT OF THE DISCLOSURE

A water still apparatus for producing distilled water is provided having the heating element for generating steam from water in a container and a condenser for condensing the steam into distilled water. The still has cascading baffles for water entering the still to pass over and for the steam to pass through, thereby preheating the entering water and removing heat from the steam. The still is automatically operated by utilizing a pair of floats for controlling the input of water and to cut off the still when the distilled water container is filled. The steam is prevented from escaping from the water inlet by having an overflow pipe feeding to below a water level on the next level of the input water path and a fan for cooling the condenser along with a heating element for maintaining the distilled water sterile are also provided as is means for making the still operate to humidify the surrounding air if desired.

BACKGROUND OF THE INVENTION

The present invention relates to water stills and especially to small water stills for use in the household or in hospitals, retirement homes, and the like, for producing distilled water.

In the past a great variety of stills have been produced for distilling a great variety of chemical substances, and especially for separating various chemicals.

In recent years, distilled drinking water has become popular because of the inadequacies of water systems, and because of the chemicals found in the water supply are felt to have harmful effects over a long period of time. This has resulted in an increase in the sale of bottled water for home consumption. It has also resulted in an increase in the sale of small water stills for producing fresh distilled water from tap water in the home for the cost of the electricity of running the still and for producing fresh distilled water which has the chemicals, bacteria and inorganic minerals removed from the water. These small stills generally provide a heating element for heating water in a container and then have some means for condensing the water into a second container and are generally a nuisance and very simple in operation.

The present invention provides a small water still which is fully automatic, which increases the efficiency of the heat being used in the distilling operation thereby allowing greater amounts of distilled water to be obtained from a smaller still working automatically thereby allowing the smaller still to be utilized for a larger amount of distilled water.

SUMMARY OF THE INVENTION

The present invention relates to water stills for producing distilled water and includes a heating element located in a water container for producing steam from the water therein. The steam is then directed towards a condenser which converts the steam into distilled water which is directed into a second container. The second container has a heating element for destruction of bacteria therein because of the automatic operation of the still which may result in leaving distilled water in the container over longer periods of time. A pair of floats, one located in the container for the water being distilled, and the second located in the distilled water container, control the operation of the still including turning on the heating element, controlling the input of water into the still and the operation of an electric motor driving a fan for removing heat from the condenser. A cascading set of baffles is located between the input for the water and the container for heating the water, so that the water is allowed to cascade over the baffles into the container while the steam is forced around the baffles to the condenser, thereby preheating the entering water and causing said water to release steam and removing some initial heat from the steam to generate a more efficient still. The steam is blocked from escaping through the water inlet by an overflow pipe feeding below the water level on the next level. The first float drives a valve controlling the input of the water so as to prevent the still from overfilling at that point while the float in the distilled water container operates a microswitch for disabling further operation of the still to prevent the distilled water container from overflowing. A flexible bag container for holding the distilled water may also be provided along with means for humidifying the surrounding air by providing an opening to heated water in the still to allow water vapor to escape. The still is designed for easy cleaning by the removal of sections which accumulate minerals from the water.

BRIEF DESCRIPTION OF THE DRAWINGS

Other objects, features and advantages of this invention will be apparent from a study of the written description of the drawings, in which.

DESCRIPTION OF THE PREFERRED EMBODIMENT

Figure 1:
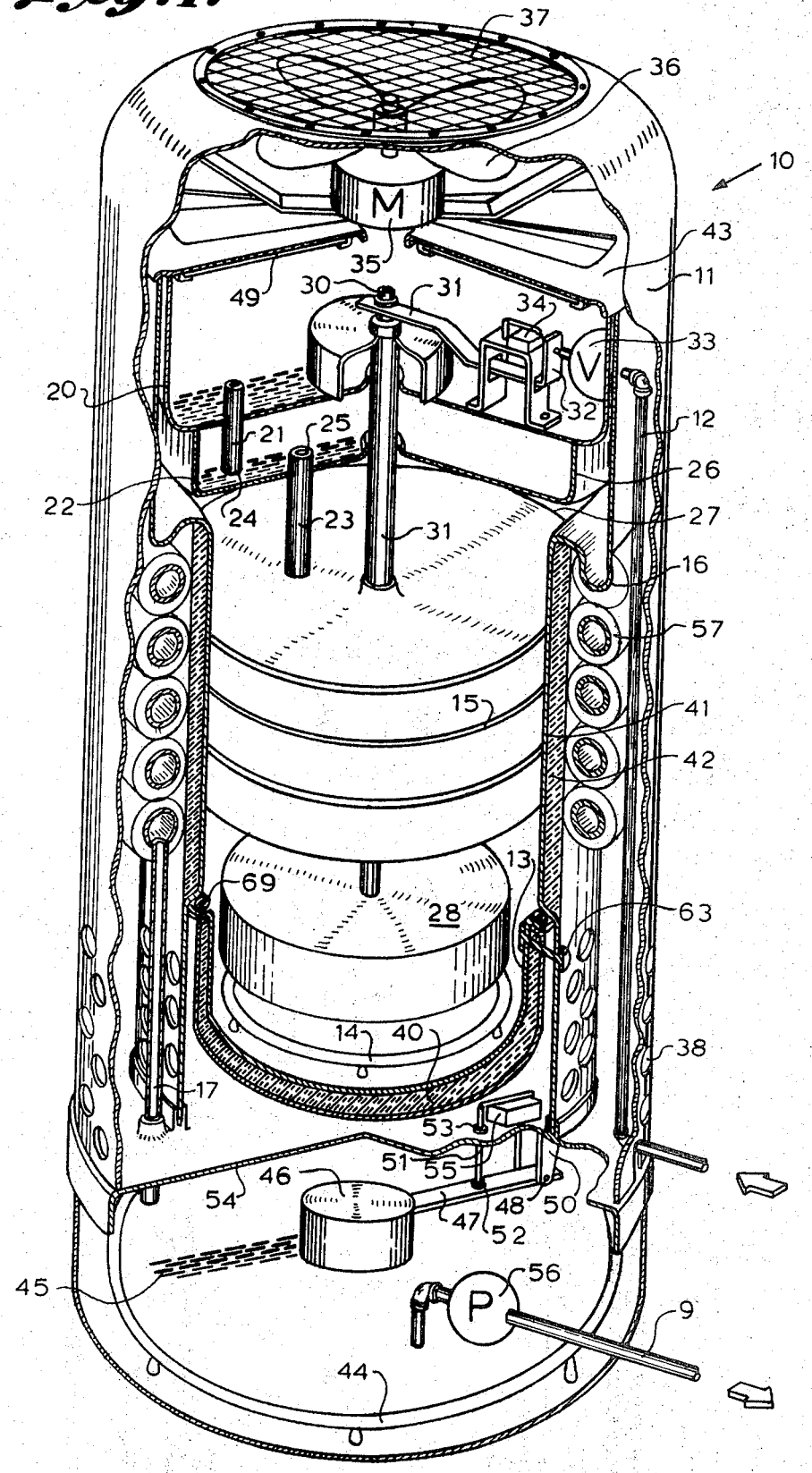
FIG. 1 is a cutaway perspective view of a water still in accordance with the present invention.
Figure 2:
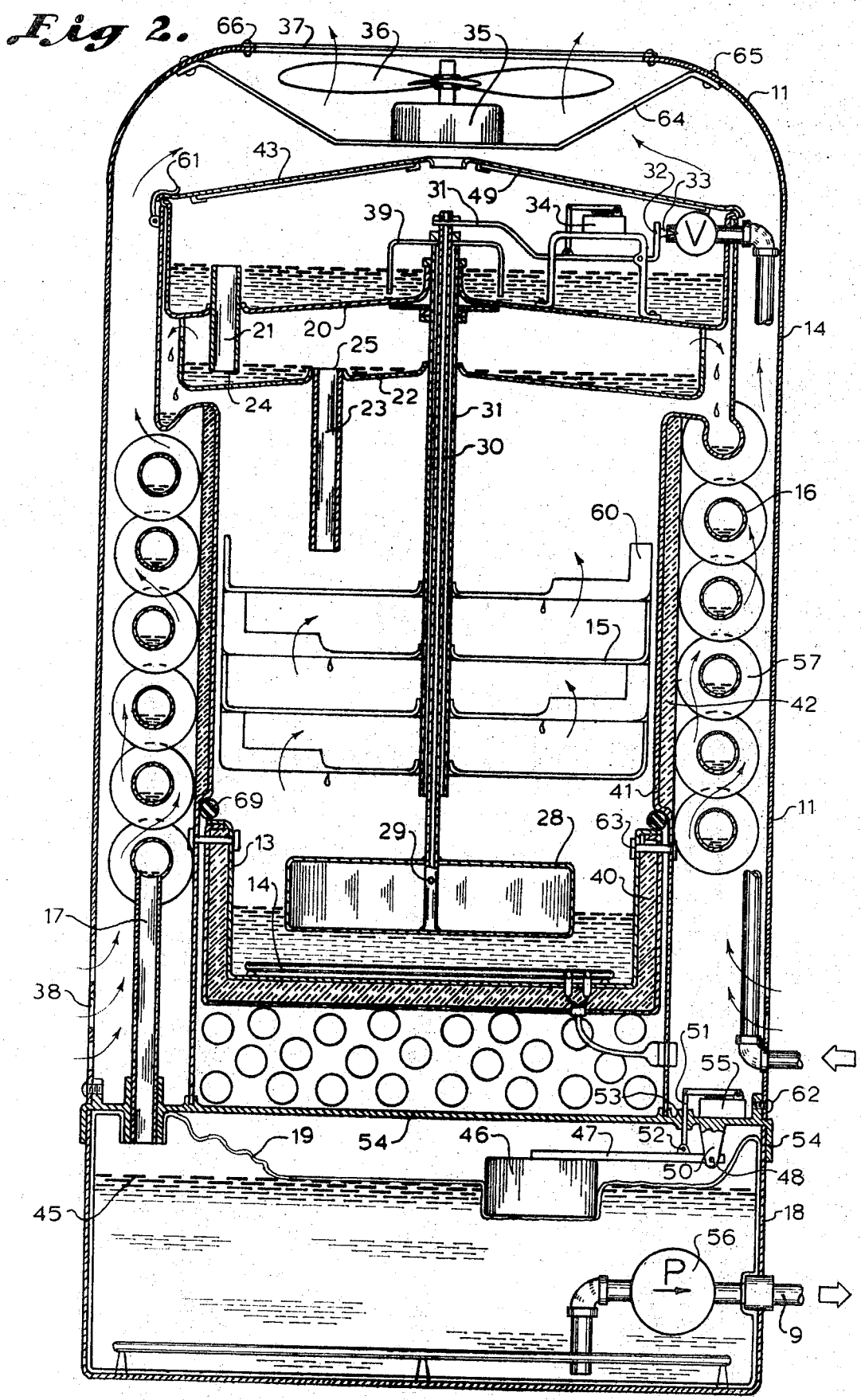
FIG. 2 is a cutaway sectional view of the still shown in FIG. 1.

Referring to FIGS. 1 and 2, two perspective views of a preferred embodiment of a water still 10, are illustrated having a casing 11 with a water input line 12 for receiving water from a water source, and a water output line 9. The input water line 12 enters from the bottom portion of the still so that the cover 11 can be easily slipped off for entry into the still 10. The still has the usual elements of the water container 13 having a heating element 14 therein for generating steam from the water entering the still at the input 12. Steam generated in the container 13 will pass through a plurality of cascading baffles 15 into the condenser 16 where it will be condensed into water which will drain through a pipe 17 into a distilled water container 18 having a flexible plastic liner 19 therein. Water entering the input 12 is fed into a first level container 20 where it overflows through an overflow pipe 21 into a second water containing level 22 where it then overflows through an overflow pipe 23 into the first of the baffles 13. Overflow pipe 21 between the first and second levels 20 and 22 has its bottom portion 24 below the water level of the second container 22 which water level is controlled by the top 25 of the overflow pipe 23. Thus the steam generated in the container 13 will be prevented from escaping through the overflow pipe 21 by its bottom portion 24 being below water, forcing the steam into the condenser 16 through the main opening 27 of the condenser 16. A main float 28 floats in the water in the container 13 and drives a tube 30 located inside a cord tube 31 which is attached through the baffles 15 and through the water level containers 20 and 22, the bottom surfaces of which are angled for condensed water to flow to the condenser.

Tube 30 has a vent 29 at its lower end to allow air to be vented into and out of the float 28 through the tube 30 to prevent the build-up of pressure during the heating and cooling of the float 28 when operating the still. Tube 30 has a water seal cup 39 attached to its upper end which seals the tube 31 from moisture passing between tubes 30 and 31. The edge of the cup 39 is always beneath the water level and this eliminates having O-ring or similar seals which might be subject to sticking. The center tube 30 is attached to the float 28 at one end and to a valve and microswitch control bracket 31 at the opposite end. Bracket 31 has a curved portion 32 which drives a needle valve 33 which controls the flow of the input water through the input pipe 12, thus as the float 28 rises to a predetermined level, it will drive the bracket 31 which in turn will drive the curved portion 32 to close the needle valve 33 to shut off the water 12 so that the container 13 will not overfill. This bracket 31 also activates a microswitch 34 which controls the operation of heating element 14 and motor 35 and disables the still if the water in container 13 gets too low. A motor 35 has a fan blade 36 which blows air through a screen 37 located in the top of the casing 11. The air is drawn through openings 38 in the bottom portion of the casing 11 around the condenser 16 and 36 and out of the still 10, cooling the condenser and removing any unwanted gases or moisture in the still. The container 13 for holding the water has insulation 40 surrounding its exterior to prevent the loss of heat from the element 14 outside of the container while the baffles 15 are surrounded by an inner wall 41 which has insulation 42 therearound to prevent the loss of heat of the steam passing through the baffles 15 by walls 41 becoming heated and radiating the heat. The top level container 20 has a lid 43 which provides for an easy entry into the top portion of the still yet insulates the top portion of the still from the fan motor 35. A rotating vane 40 allows the lid 43 to have a variable opening therein to allow water vapor to escape into the air stream generated by the fan 36 and lets the still 10 act as a humidifier at the option of the used. The bottom container 18, liner 19 contains a heating element 44 therein which is utilized to heat water 45 in the container 18 for killing bacteria and other microbiological agents which might develop cultures by the water 45 remaining in the container liner 19 for an excessive length of time. The container liner 19 also has a float 46 floating thereabove which float 46 is connected to a float bracket 47 which is pinned at 48 to a float support bracket 50. A rod 51 is pinned at 52 to the bracket 47 and riding through an opening 53 in a cover 54 for the container 18 and liner 19. Rod 51 drives a microswitch 55 which disables the operation of the still when the water 45 reaches a predetermined level thereby preventing the overflow of the distilled water. The switch 55 disables the heating element 14 along with the motor 35. Float 28 blocks the flow of the water in input pipe 12 until some water is removed from the container. Water is removed from the container 18 by a small pump 56 pumping water through the output pipe 9, but it should of course be clear that water can be removed in any manner desired without departing from the spirit and scope of the invention. The pump 56 allows water to be removed automatically upon command of a water cooler or faucet, or the like, if desired by the owner.

The condenser 16 runs in a helical pattern around the insulation 42 and has cooling fins 57 thereon for maintaining the condenser cool for condensing the moisture in the steam passing therein to increase the efficiency of the operation of the still for higher production from a small still.

As more clearly seen in FIG. 2, the baffles have openings with ledges 60 thereon for forcing the direction of the water to cascade from one side of each baffle 15 to the other and down to the next level, and forcing the steam leaving container 13 to follow the same path through the baffles. The baffles 15 will be heated by the steam passing therethrough which will in turn preheat the water entering the still causing the water release steam and increase the efficiency of the operation of the still. FIG. 2 also more clearly shows lid 43 having a latch 61 for entering thereinto and the interconnection of several components of the still, such as the cover 54 being bolted with a bolt 62 to the outer container 11, but with the cover 54 setting on top of the container 18. The water container 13 is locked in place after compressing gasket 69 with studs 63 by use of a twist tight slot in 41 to the interior sides 41 which are in turn connected to the condenser and to the outer wall of 13. The fan motor 35 is connected through brackets 64 to the top of the casing 11 by bolts 65 while the top screen 37 is connected by bolts 66 to the casing 11. Container 13 can be easily removed by twisting it so that studs 62 are loosened from the container 13 and by unplugging the heating element and removing the container through a door in the side of the still (not illustrated).

Figure 3:
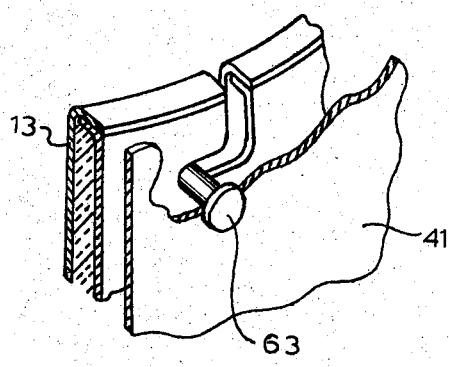
FIG. 3 is a perspective view of a section showing the means for removably attaching the water heating container to the water still.
Figure 4:
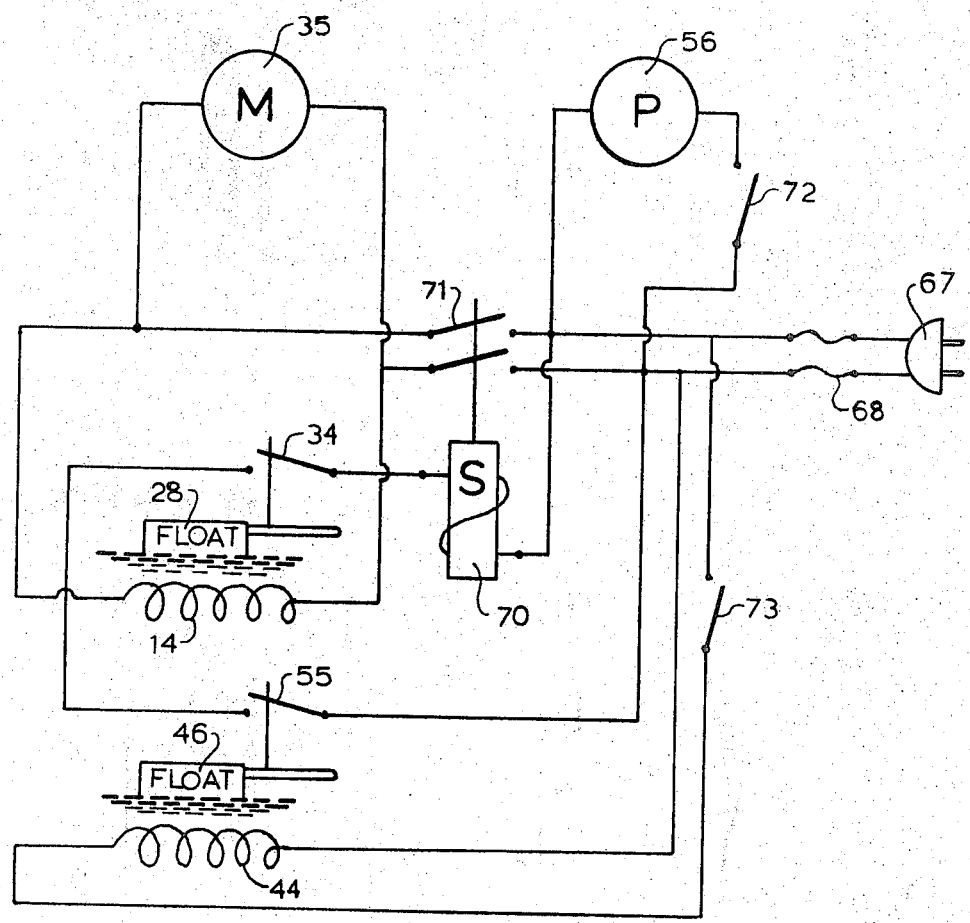
FIG. 4 is an electrical diagram for operating the still in accordance with the present invention.

Referring now more specifically to FIG. 3, a wiring diagram is illustrated having the heating element 44, and pump 56 wired through switches 73 and 72 respectively to a standard electrical outlet plug 67 and through a fuse 68. The upper float 28 and the lower float 46 are connected to the microswitches 55 and 34 respectively for completing a circuit to activate a solenoid switch 70 when float 46 is low and float 38 is high. Thus, with the closing of the series connected switches 55 and 34, the solenoid 70 will drive a double-pole single-throw switch 71 which will operate the motor 35 and heating element 14 while separate switches 72 and 73 will allow an operation of the pump 56 for removing water from the still and heating the distilled water with heating element 44. Opening of either switch 55 or 34 will disable the solenoid 70 and the entire still including the heating element 14.

It should be clear at this point that a small water still apparatus has been provided which provides a simple automatic operation yet is efficient in the use of the electricity generating the heat therefor. The materials utilized for the still can be any desired, but water containers with heating elements and condenser tubing is preferably made of materials such as strainless steel which will not be corroded by continuous operation of the steam and water chemicals. Other components which do not have to reach as high a temperature can be made of suitable polymers or plastics, while the insulation materials would be typically foamed urethanes or polystyrene which would not be unduly affected by the moisture or heat.

This invention is not to be construed as limited to the particular forms disclosed herein since these are to be regarded as illustrative rather than restrictive.

I claim:

1. A water still for producing distilled water comprising in combination:
   (a) a first container for receiving water from a water source;
   (b) heating means located in said first container for producing steam from water in said container;
   (c) helical condenser means for converting said steam produced from water in said first container into water and being operatively connected to said first container;
   (d) second container for catching and holding said condensed steam from said condenser;
   (e) second heating means located in said second container for heating said distilled water for preventing the the growth of microbiological agents;
   (f) first and second float means, said first float means floating in said first container and operatively connected to an input water source for controlling the input of water to maintain the level of water in said first container; and said second float means floating in said second container and connected to a microswitch to prevent said second container from overflowing by disabling the operation of said still; and (g) a plurality of baffles located between the input from the water source and said first container for said water to pass thereover to enter said first container by preheating said water entering said first container, and for said steam to pass therebetween to provide water vapor and for preheating the water entering said first container; and (h) said first float means being connected to an arm passing through said baffles to actuate a valve controlling the input of water into said first container whereby a water still operates in accordance with the water levels of both distilled and input water while maintaining the distilled water substantially free of bacteria.

2. The apparatus in accordance with Claim 1 in which said first float means includes a passageway to vent said float through a tube, which tube connects said float to a bracket, which operates said valve, said passageway preventing the build-up of pressure in said float.

3. The apparatus in accordance with Claim 1 in which said input of water from said water source passes onto a first shelf and from said first shelf to a second shelf through a pipe extending below the water level in said second shelf prior to entering said first container.

4. The apparatus in accordance with Claim 3 in which insulation is located between said condenser and said containers and baffles.

5. The apparatus in accordance with Claim 1 in which a motor driven fan draws air over said condenser for removing heat from said condenser.

6. The apparatus according to Claim 5 in which said still has a lid between said fan and first container means for blocking the escape of water vapor, said lid having adjustable openings therein for allowing the escape of water vapor into the air being moved by said fan to increase the moisture content of the air surrounding said still.

7. The apapratus in accordance with Claim 4 in which said second container has an output therefrom connected to a pump for removing water from said second container.

8. The apapratus in accordance with Claim 7, in which said first container heating element is actuated by either said first or second float means.

9. The apparatus in accordance with Claim 8 in which said baffles for said water and steam passing therebetween to flow in a sepentine path therethrough heating the water and baffles while removing heat from the steam.

10. The apparatus in accordance with Claim 1 in which said second container has a flexible bag therein connected to the output from said condenser and adapted to expand or collapse with the ingress and egress of water.

11. The apparatus in accordance with Claim 2 in which said tube rides through a second tube and has a cup seal member connected to one end thereof, said cup seal member located to have the open portion thereof protruding into water at all times to seal the space between said tubes against the passage of water vapors.

References Cited

UNITED STATES PATENTS

| | | | |
|---|---|---|---|
| 3,694,321 | 9/1972 | Marovich | 202—187 |
| 3,696,003 | 10/1972 | Fitch | 202—181 |
| 3,312,600 | 4/1967 | Morton | 202—187 |
| 1,623,136 | 4/1927 | Seguy | 203—1 |
| 3,020,214 | 2/1962 | Beduhn | 203—1 |
| 3,401,091 | 9/1968 | Gidner | 202—187 |
| 3,563,861 | 2/1971 | Fletcher | 202—181 |
| 3,393,131 | 7/1968 | McIntyre | 202—187 |

NORMAN YUDKOFF, Primary Examiner

H. H. BERNSTEIN, Assistant Examiner

U.S. Cl. X.R.

202—179, 181, 187, 202